(12) United States Patent
Barillot et al.

(10) Patent No.: US 12,326,190 B2
(45) Date of Patent: Jun. 10, 2025

(54) POWERTRAIN ASSEMBLY FOR AN INDUSTRIAL VEHICLE

(71) Applicant: Volvo Truck Corporation, Gothenburg (SE)

(72) Inventors: Thomas Barillot, Mornant (FR); Bertrand Cauvin, Reyrieux (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/619,859

(22) Filed: Mar. 28, 2024

(65) Prior Publication Data
US 2024/0328504 A1   Oct. 3, 2024

(30) Foreign Application Priority Data

Mar. 31, 2023  (EP) ..................... 23166003

(51) Int. Cl.
*B60K 1/02*  (2006.01)
*F16H 57/02*  (2012.01)
(Continued)

(52) U.S. Cl.
CPC ........... *F16H 57/0471* (2013.01); *B60K 1/02* (2013.01); *F16H 57/029* (2013.01);
(Continued)

(58) Field of Classification Search
CPC ............... F16H 57/0471; F16H 57/029; F16H 57/0423; F16H 57/0424; F16H 57/0436;
(Continued)

(56) References Cited

U.S. PATENT DOCUMENTS

2006/0166778 A1  7/2006  Tabata et al.
2014/0141933 A1*  5/2014  Pette .................. F16D 31/00
                                                 74/661
(Continued)

FOREIGN PATENT DOCUMENTS

CN   108343732 A   7/2018
EP   4067145 A1   10/2022
(Continued)

OTHER PUBLICATIONS

Extended European Search Report, European Application No. 23166003.6, mailed Sep. 11, 2023, 9 pages.

*Primary Examiner* — Tisha D Lewis
(74) *Attorney, Agent, or Firm* — Sage Patent Group

(57) ABSTRACT

A powertrain assembly for an industrial vehicle includes an axle housing receiving an output wheel, a geartrain including a first input shaft, a second input shaft, an output shaft engaged with the output wheel and an oil circulation pump configured to supply oil to gears of the geartrain. The powertrain assembly also includes a first electric motor including a rotor coupled to the first input shaft of the geartrain and the rotor being supported by a first sealing and bearing assembly. The powertrain assembly also includes a second electric motor including a rotor coupled to the second input shaft of the geartrain. The powertrain assembly also includes a first oil supply channel configured to supply some of the oil flow of the oil circulation pump to the first sealing and bearing assembly.

16 Claims, 5 Drawing Sheets

(51) Int. Cl.
*F16H 57/029* (2012.01)
*F16H 57/04* (2010.01)

(52) U.S. Cl.
CPC ..... *F16H 57/0423* (2013.01); *F16H 57/0424* (2013.01); *F16H 57/0436* (2013.01); *F16H 57/045* (2013.01); *F16H 57/0472* (2013.01); *F16H 2057/02034* (2013.01); *F16H 2057/02052* (2013.01); *F16H 2057/0206* (2013.01)

(58) Field of Classification Search
CPC ............... F16H 57/045; F16H 57/0472; F16H 2057/02034; F16H 2057/02052; F16H 2057/0206; B60K 1/02
See application file for complete search history.

(56) References Cited

U.S. PATENT DOCUMENTS

| | | | | |
|---|---|---|---|---|
| 2014/0256493 | A1* | 9/2014 | Knoblauch | B60K 17/046 475/151 |
| 2020/0240511 | A1 | 7/2020 | Hori | |
| 2022/0316583 | A1* | 10/2022 | Granottier | F16H 57/0439 |
| 2023/0146341 | A1* | 5/2023 | Nakawatari | F16H 57/0483 180/339 |

FOREIGN PATENT DOCUMENTS

| | | | |
|---|---|---|---|
| JP | 2012166738 A | 9/2012 | |
| JP | 2018053996 A | 4/2018 | |

\* cited by examiner

POWERTRAIN ASSEMBLY FOR AN INDUSTRIAL VEHICLE

CROSS REFERENCE TO RELATED APPLICATIONS

This application claims priority to European Patent Application No. 23166003.6, filed on Mar. 31, 2023, the disclosure and content of which is incorporated by reference herein in its entirety.

TECHNICAL FIELD

This disclosure relates to a powertrain assembly for an industrial vehicle. In particular, it relates to an electric powertrain for a truck.

BACKGROUND ART

In the same way as cars powertrains are shifting from combustion engines to electric motors, electric propulsion is on the way of becoming the new standard for trucks.

An electric powertrain may comprise one, two or more electric motors delivering mechanical power to the driving wheels of the truck through a gearbox and an axle. Electric motors have a rotor that may be supported by rolling bearings. In many applications, rolling bearings are lubricated by grease, which is applied at the manufacturing stage for the whole service life of the bearing. In some applications, because of the high-power output of these electric motors and of the tight packaging of the whole powertrain, thermal loads in the bearings area will be quite high. The temperature may be consistently above the maximum operational temperature of the grease, resulting in rapid wear of the bearing and increased failure rate. Even when greased bearings can be used, because thermal loads are moderate enough, the seal disposed next to the bearing and sealing the rotor shaft may require some degree of cooling to ensure long-term reliability.

To solve these issues, it is common to supply an oil flow either to the rolling bearing itself, or to the seal disposed next to the bearing. This oil flow ensures adequate lubrication and cooling of the bearing elements. The oil flow also ensures adequate cooling of the seal when it is directed towards this seal. When the electric motors are fixed to the axle of the truck, the oil supplied to the bearings of the electric motors may be the oil of the axle.

Various solutions have already been provided. The oil may for example be supplied to the bearing by the projections from the output wheel, or ring gear, of the axle, whose lower part is immerged in an oil storage volume. When the powertrain comprises several electric motors, obtaining a correct flow for all the motors and across the whole vehicle speed range is challenging. Indeed, the bearing of a motor disposed in an upper position may receive insufficient oil flow, particularly at low vehicle speed, while the bearing of a motor disposed in a lower position may simultaneously receive an excessive oil flow. The lower bearing can even be fully immersed in the volume of stored oil.

To overcome this difficulty, the oil may also by supplied by a specific oil pump disposed in the axle housing. The additional pump increases the weight and cost of the powertrain, and its integration in the axle housing may be difficult.

There is therefore a need for providing an optimized solution for lubricating the bearing of the electric motors of an electric powertrain.

SUMMARY

To this end, it is proposed a powertrain assembly for an industrial vehicle, comprising:
  an axle housing receiving an output wheel,
  a geartrain comprising:
    a first input shaft,
    a second input shaft,
    an output shaft engaged with the output wheel,
    an oil circulation pump configured to supply oil to gears of the geartrain,
  a first electric motor, comprising a rotor coupled to the first input shaft of the geartrain, the rotor being supported by a first sealing and bearing assembly,
  a second electric motor, comprising a rotor coupled to the second input shaft of the geartrain,
  a first oil supply channel configured to supply some of the oil flow of the oil circulation pump to the first sealing and bearing assembly.

In some embodiments, the rotor of the first electric motor is coupled to the first input shaft of the geartrain by a first coupling shaft. Also, the rotor of the second electric motor is coupled to the second input shaft of the geartrain by a second coupling shaft. Direct coupling is also an option, which means that first and second coupling shaft are optional. The first and second coupling shafts can also be the input shafts of the geartrain.

At least a part of the first coupling shaft and at least a part of the second coupling shaft extend in the axle housing.

Since some of the oil flow of the gearbox pump is diverted to feed oil to the first sealing and bearing assembly of the first electric motor, an adequate oil flow can be supplied to this bearing assembly. Reliable lubrication and cooling are obtained. As the same pump is used to lubricate the internal gears of the gearbox and the sealing and bearing assembly of the first electric motor, the number of additional components to be fitted is limited.

The following features can optionally be implemented, separately or in combination one with the others:

The first sealing and bearing assembly comprises a first bearing and a first seal.

The seal of the first sealing and bearing assembly is radially comprised between the shaft of the rotor of the first electric motor and the housing of the first electric motor.

In an embodiment of the powertrain assembly, the first oil supply channel is configured to supply some of the oil flow of the oil circulation pump to a bearing of the first sealing and bearing assembly.

The oil flow derived from the geartrain can thus lubricate the first bearing. Reliability of the first bearing is improved.

In another embodiment of the powertrain assembly, the first oil supply channel is configured to supply some of the oil flow of the oil circulation pump to a seal of the first sealing and bearing assembly.

When the bearing of the first sealing and bearing assembly is greased for the whole lifetime of the bearing, the bearing itself does not need lubrication by oil but the seal disposed radially between the shaft of the rotor and the casing of the first electric motor may require cooling and/or lubrication. This cooling is ensured by an oil flow derived from the geartrain. Reliability of the seal is improved.

The output wheel is coupled to the driving wheels of the industrial vehicle.

The powertrain assembly comprises driveshafts coupling the driving wheels of the vehicle and the output wheel.

The output wheel is coaxial with the driveshafts.

The output wheel is a ring gear of a differential.

The driveshafts are coupled to the driving wheels of the vehicle by sun gear and planetary gear engaging together.

The first input shaft of the geartrain comprises gears arranged in a gear housing.

The second input shaft of the geartrain comprises gears arranged in the gear housing.

A driving gear of the output shaft of the geartrain is arranged in the gear housing.

The gear housing is separate from the axle housing.

The gear housing contains a first lubricant.

The first lubricant lubricates the gears of the geartrain.

The axle housing contains a second lubricant different from the first lubricant.

The second lubricant lubricates the contact between the output wheel and the driving gear of the output shaft.

In an embodiment, the geartrain may comprise a fixed gear ratio between the first input shaft and the output shaft. Similarly, the geartrain may comprise a fixed gear ratio between the second input shaft and the output shaft.

In another embodiment, the geartrain may comprise multiple selectable gear ratios between the first input shaft and the output shaft. Similarly, the geartrain may comprise multiple selectable gear ratios between the second input shaft and the output shaft. In other words, the geartrain may be a gearbox. The gear housing is thus a gearbox housing.

The first coupling shaft may be integral with the first input shaft. In other words, the rotor of the first electric motor can be directly coupled to the first input shaft of the geartrain.

Similarly, the second coupling shaft may be integral with the second input shaft. In other words, the rotor of the second electric motor can be directly coupled to the second input shaft of the geartrain.

The first bearing is a rolling bearing. The first bearing may be a ball bearing, or a roller bearing, or a needle bearing.

The rotor of the second electric motor is supported by a second sealing and bearing assembly.

The second sealing and bearing assembly comprises a bearing and a seal.

The seal of the second sealing and bearing assembly is radially comprised between the shaft of the rotor of the second electric motor and the housing of the second electric motor.

The second bearing is a rolling bearing. The second bearing may be a ball bearing, or a roller bearing, or a needle bearing.

The first bearing supports the end of the rotor of the first electric motor which is coupled to the first coupling shaft.

The second sealing and bearing assembly supports the end of the rotor of the second electric motor which is coupled to the second coupling shaft.

The first electric motor is attached to the axle housing.

The second electric motor is attached to the axle housing.

The rotor of the first electric motor and the rotor of the second electric motor are parallel.

The oil circulation pump is a mechanical pump driven by a rotating part of the geartrain or by an electric pump.

According to an embodiment, the powertrain assembly comprises:
- a first chamber in fluidic communication with the first sealing and bearing assembly, in which the first oil supply channel opens in the first chamber,
- a second chamber in fluidic communication with the second sealing and bearing assembly,
- a second oil supply channel configured to convey some of the oil from the first chamber to the second chamber so as to lubricate the second sealing and bearing assembly.

In an embodiment, the second oil supply channel is configured to supply oil to a bearing of the second sealing and bearing assembly.

The oil flow conveyed by the second oil supply channel delivers an oil flow to the bearing of the second sealing and bearing assembly. This bearing can thus be adequately lubricated and cooled.

In another embodiment, the second oil supply channel is configured to supply oil to a seal of the second sealing and bearing assembly.

When the bearing of the second sealing and bearing assembly is greased for its whole lifetime duration, the bearing itself does not need to be lubricated but the corresponding seal disposed radially between the rotor of the second electric motor and the casing of the second electric motor may require cooling. This cooling is ensured by the oil flow supplied through the second oil supply channel.

The first bearing is disposed in a first receiving housing. The first receiving housing is in fluidic communication with the first chamber.

The second bearing is disposed in a second receiving housing. The second receiving housing is in fluidic communication with the second chamber.

In an embodiment of the powertrain assembly, the first chamber is disposed at a higher height than the second chamber, along a vertical axis, when the powertrain assembly is in a nominal installation position in the vehicle with the vehicle on a horizontal and level surface.

The second oil supply channel is configured to allow the oil to flow from the first chamber to the second chamber under the effect of gravity.

The first chamber is configured to form an oil storage volume.

The second chamber is configured to form an oil storage volume.

In an embodiment of the powertrain assembly, the second oil supply channel is formed by an internal cavity of the axle housing.

The second oil supply channel is machined in the axle housing.

The second oil supply channel requires no additional part.

The second oil supply channel is linear.

The second oil supply channel is drilled in the axle housing.

The second oil supply channel is obtained by simple machining of the axle housing.

According to an embodiment, the powertrain assembly comprises a third channel configured to convey an oil flow from the second chamber to the geartrain.

In an embodiment, the powertrain assembly comprises a first tubular member, and a portion of the first oil supply channel is formed by an internal cavity of the first tubular member. In some embodiments, the first tubular member may surround the first coupling shaft.

The first tubular member is fixed relatively to the axle housing.

The first tubular member surrounds the first input shaft along a portion of the length of the first input shaft.

Compared to configuration in which lubrication of the bearing of the first electric motor and of the bearing of the second electric motor is done by projections from the output wheel, only static sealing between the first tubular member and the axle housing is required. No dynamic seal of the first input shaft of the gearbox is required, since the same oil is present in the gearbox and in the first tubular member.

The first tubular member is parallel with the first bearing.

The first tubular member has the general shape of a cylinder.

The first tubular member is disposed in the axle housing.

In an embodiment of the powertrain assembly, the first tubular member comprises the first chamber, and a portion of the first oil supply channel opens into the first chamber.

The first chamber is coaxial with the first bearing.

The internal cavity forming a portion of the first oil supply channel extends parallelly to the extension axis of the first tubular member.

The internal cavity forming a portion of the first oil supply channel opens in an upper part of the first chamber.

In an example of implementation of the powertrain assembly, a first axial end of the first tubular member abuts against the first electric motor and a second axial end of the first tubular member abuts against a gear housing.

In an embodiment, the powertrain assembly comprises a third seal between the first tubular member and the axle housing.

According to an embodiment of the powertrain assembly, the first electric motor and the second electric motor are arranged one above the other along a vertical axis.

The second oil supply channel is vertical.

According to an embodiment, the powertrain assembly comprises a second tubular member, and the third oil channel is formed by an internal wall of the second tubular member. In some embodiments, the second tubular member may surround the second coupling shaft.

The second tubular member is fixed relatively to the axle housing.

The second tubular member surrounds the second input shaft along a portion of the length of the second input shaft.

As before, no dynamic seal of the second input shaft of the gearbox is required, since the same oil is present in the gearbox and in the second tubular member.

The second tubular member is parallel with the second bearing.

The second tubular member is cylindrical.

The second tubular member is disposed in the axle housing.

The third oil supply channel is formed by the space radially extending between the inner wall of the second tubular member and the outside surface of the second coupling shaft.

In an embodiment of the powertrain assembly, the second tubular member comprises the second chamber, and the third oil channel opens into the second chamber.

The second oil supply channel opens in both the first chamber and the second chamber.

The second tubular member is disposed in the axle housing.

According to an embodiment of the powertrain assembly, a first axial end of the second tubular member abuts against the second electric motor and a second axial end of the second tubular member abuts against a gear housing.

The powertrain assembly comprises a fourth seal between the second tubular member and the axle housing.

The powertrain assembly comprises a fifth seal between the first tubular member and a gear housing.

The powertrain assembly comprises a sixth seal between the second tubular member and a gear housing.

The disclosure relates as well to a truck comprising a powertrain assembly as described earlier, in which the output wheel is coupled to the driving wheels of the truck.

The truck comprises an air suspension with a first and a second air bellow. The first electric motor and the second electric motor are disposed between the first and the second bellow along a transverse direction of the truck.

The first air bellow acts between a first main longitudinal member of the frame and the axle housing. The second air bellow acts between the second main longitudinal member of the frame and the axle housing.

BRIEF DESCRIPTION OF DRAWINGS

Other features, details and advantages will be shown in the following detailed description and on the figures, on which.

DETAILED DESCRIPTION

In order to make the figures easier to read, the various elements are not necessarily represented to scale. In these figures, identical elements receive the same reference number. Certain elements or parameters can be indexed, that is to say designated for example by 'first element' or second element, or first parameter and second parameter, etc. The purpose of this indexing is to differentiate elements or parameters that are similar, but not identical. This indexing does not imply a priority of one element, or one parameter over another, and their names can be interchanged. When it is mentioned that a subsystem comprises a given element, the presence of other elements in this subsystem is not excluded.

Figure 1:
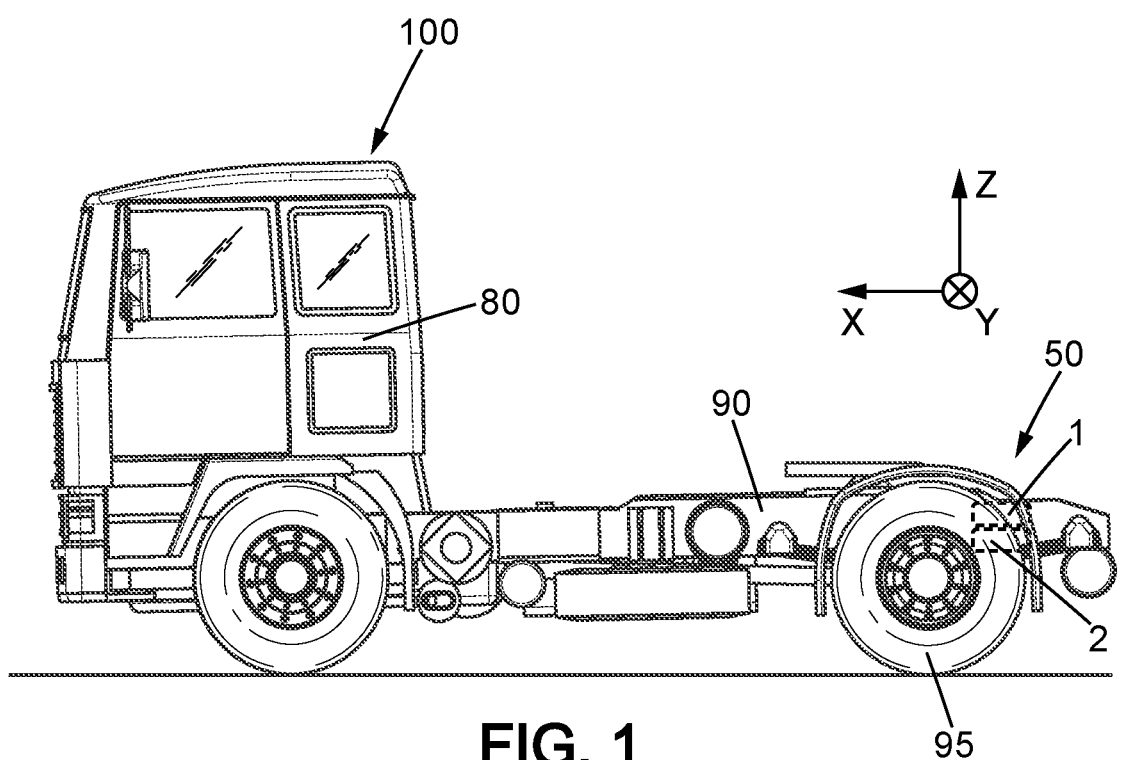
FIG. 1 is a schematic side view of a truck equipped with a powertrain assembly member according to the disclosure.

An industrial vehicle 100 is schematically represented on FIG. 1. The industrial vehicle illustrated as an example vehicle is a tractor truck. The truck 100 comprises a powertrain assembly 50 that will be detailed below. The powertrain assembly according to the present disclosure can also equip different types of vehicles, such as a porter truck, a construction truck, a bus.

The powertrain assembly 50 of the truck 100 is an electrical powertrain, meaning that vehicle propulsion is provided by two electric motors 1 and 2.

The truck 100 comprises a frame 90 with two parallel main members extending in the longitudinal direction X and linked by transverse cross-members. The truck 100 comprises an air suspension with a first and a second air bellow, not represented. The first electric motor 1 and the second electric motor 2 are disposed between the first and the second bellow along a transverse direction Y of the truck 100.

The first air bellow acts between a first main longitudinal member of the frame 90 and an axle housing 20. The second air bellow acts between the second main longitudinal member of the frame 90 and the axle housing 20.

The powertrain assembly 50 for an industrial vehicle comprises:
- an axle housing 20 receiving an output wheel 19,
- a geartrain 30 comprising:
  - a first input shaft 21, a second input shaft 22,
an output shaft engaged with the output wheel 19,
an oil circulation pump 25 configured to supply oil to gears of the geartrain 30,
a first electric motor 1, comprising a rotor 3 coupled to the first input shaft 21 of the geartrain 30, the rotor 3 being supported by a first sealing and bearing assembly 5,
a second electric motor 2, comprising a rotor 4 coupled to the second input shaft 22 of the geartrain 30,
a first oil supply channel 11 configured to supply some of the oil flow of the oil circulation pump 25 to the first sealing and bearing assembly 5.

The rotor 3 of the first electric motor 1 is coupled to the first input shaft 21 of the geartrain 30 by a first coupling shaft 7. Similarly, the rotor 4 of the second electric motor 2 is coupled to the second input shaft 22 of the geartrain 30 by a second coupling shaft 8. At least a part of the first coupling shaft 7 and at least a part of the second coupling shaft 8 extend in the axle housing 20.

The first sealing and bearing assembly 5 comprises a first bearing 5A and a first seal 5B.

The first bearing 5A and the first seal 5B are disposed next to each other. The axial position of the first bearing 5A and the first seal 5B with respect to the rotor 3 of the first electric motor 1 differs between the illustrated embodiments, as it will be described hereafter.

In all the examples, the seal 5B of the first sealing and bearing assembly 5 is radially comprised between the shaft of the rotor 3 of the first electric motor 1 and the housing of the first electric motor 1.

A fraction of the oil flow generated by the geartrain or gearbox pump 25 is derived to feed an oil flow to the first sealing and bearing assembly 5 of the first electric motor 1. The same pump 25 is used for lubricating the internal gears of the geartrain or gearbox 40 and also for lubricating the sealing and bearing assembly 5 of the first electric motor 1. The number of extra components to be fitted is limited, and so is the additional cost for supplying oil to the first sealing and bearing assembly 5.

Figure 3:
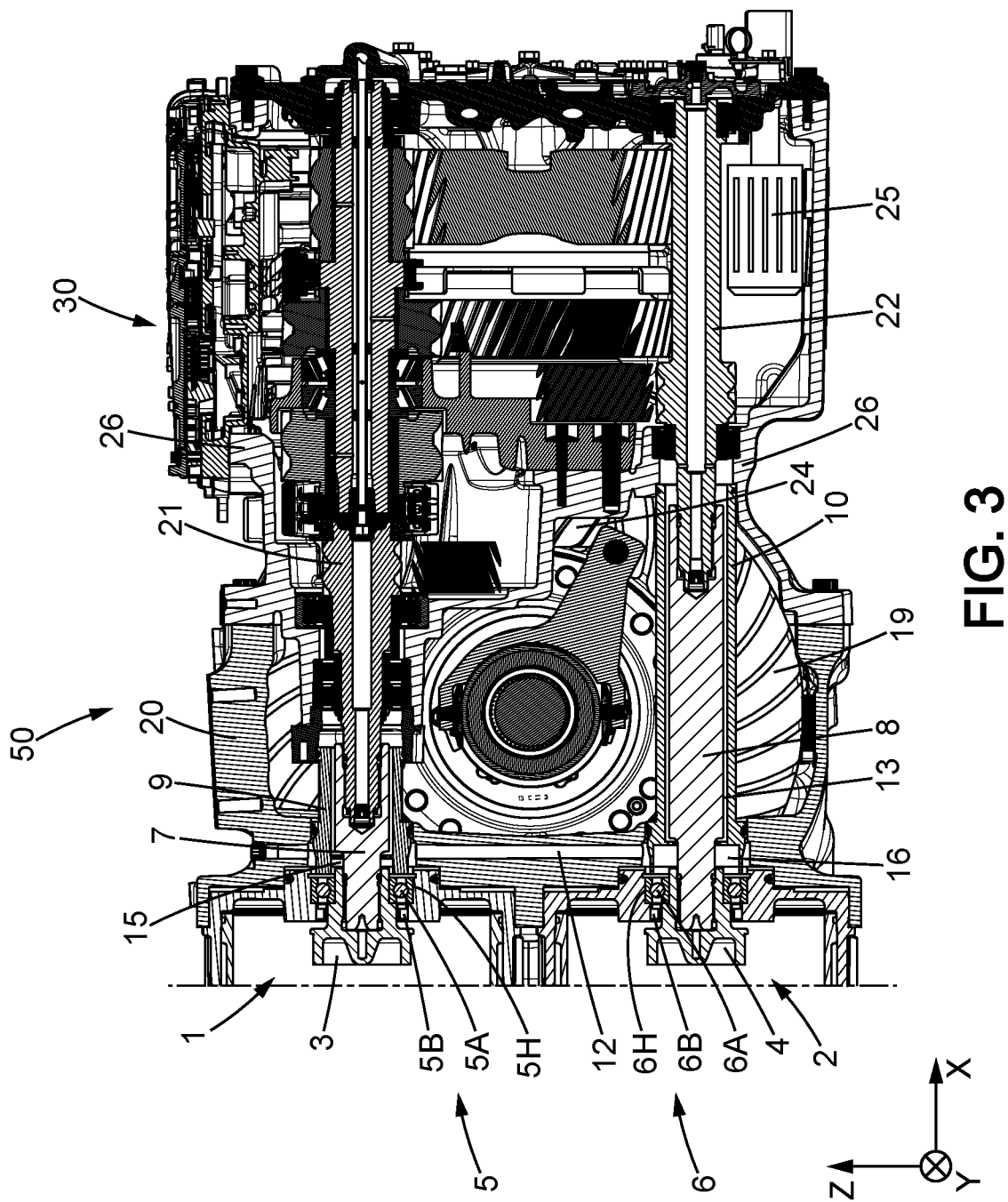
FIG. 3 is a detailed side view, in cross section, of a second embodiment of a powertrain assembly.
Figure 5:
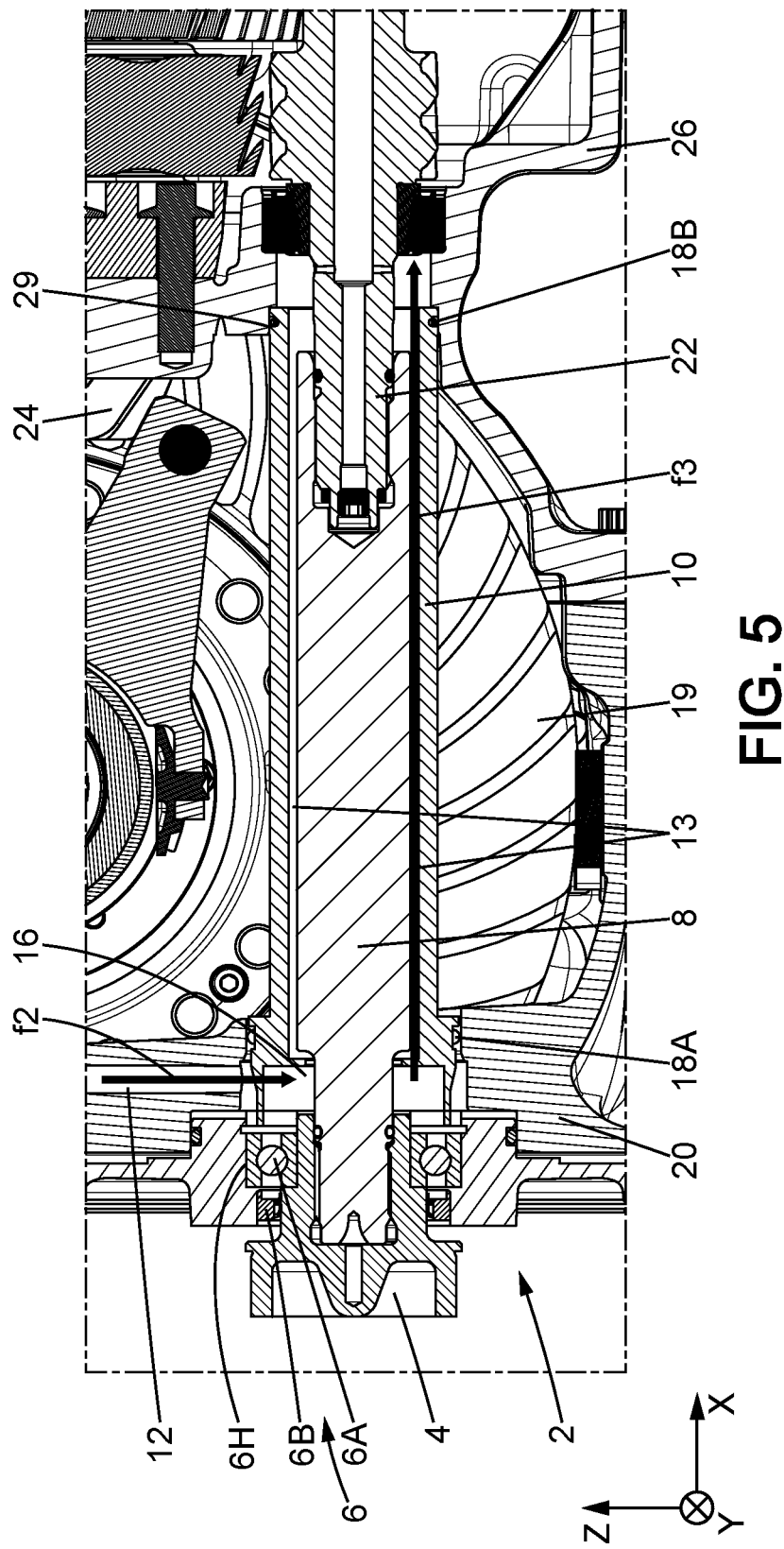
FIG. 5 is a detailed view of the powertrain assembly of FIG. 3 schematically indicating a second part of the lubrication oil circulation.

In an embodiment of the powertrain assembly 50, represented on FIG. 3 and FIG. 5, the first oil supply channel 11 is configured to supply some of the oil flow of the oil circulation pump 25 to a bearing 5A of the first sealing and bearing assembly 5. The oil flow is schematically indicated on FIG. 5 by the arrows with the reference sign f2 and f3. f2 represents the oil flow flowing from the first chamber 15 to the second chamber 16 through the second oil supply channel 12. f3 represents the oil flowing back to the oil storage part of the gear housing 26 through the third oil supply channel 13.

In this embodiment, the first bearing 5A receives the oil flow delivered through the first oil supply channel 11. The first bearing 5A is thus lubricated and cooled by this oil flow. The reliability of the first bearing 5A can be improved.

In this embodiment in which the bearing 5A of the first sealing and bearing assembly 5 is supplied with oil, the seal 5B is axially comprised between the rotor 3 of the first electric motor 1 and the bearing 5A of the first sealing and bearing assembly 5. The first seal 5B prevents the oil lubricating the first bearing 5A from leaking in the volume in which the rotor 3 and stator of the first electric motor 1 are received.

Figure 2:
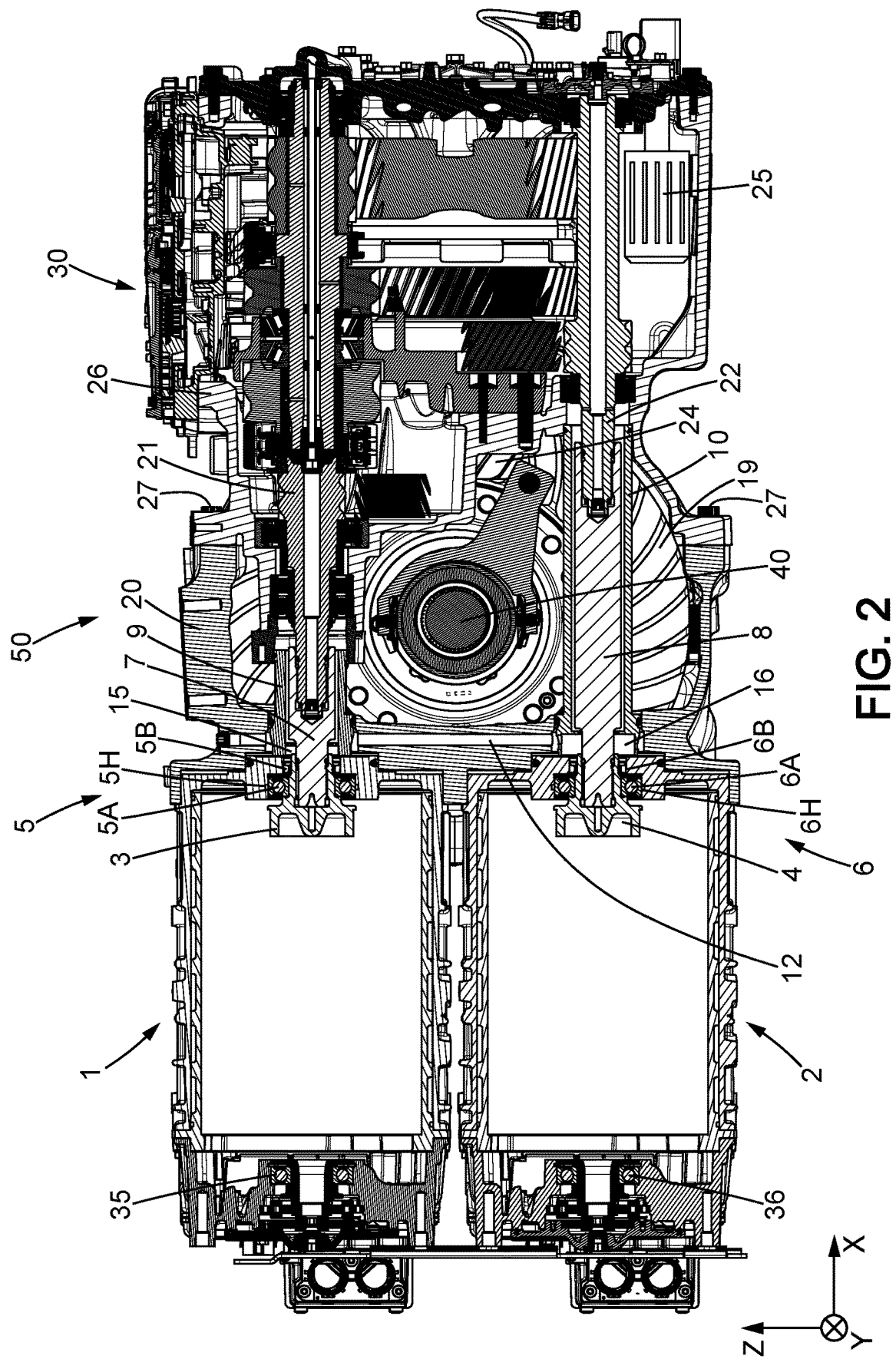
FIG. 2 is a side view, in cross section, of a first embodiment of a powertrain assembly according to the disclosure.
Figure 4:
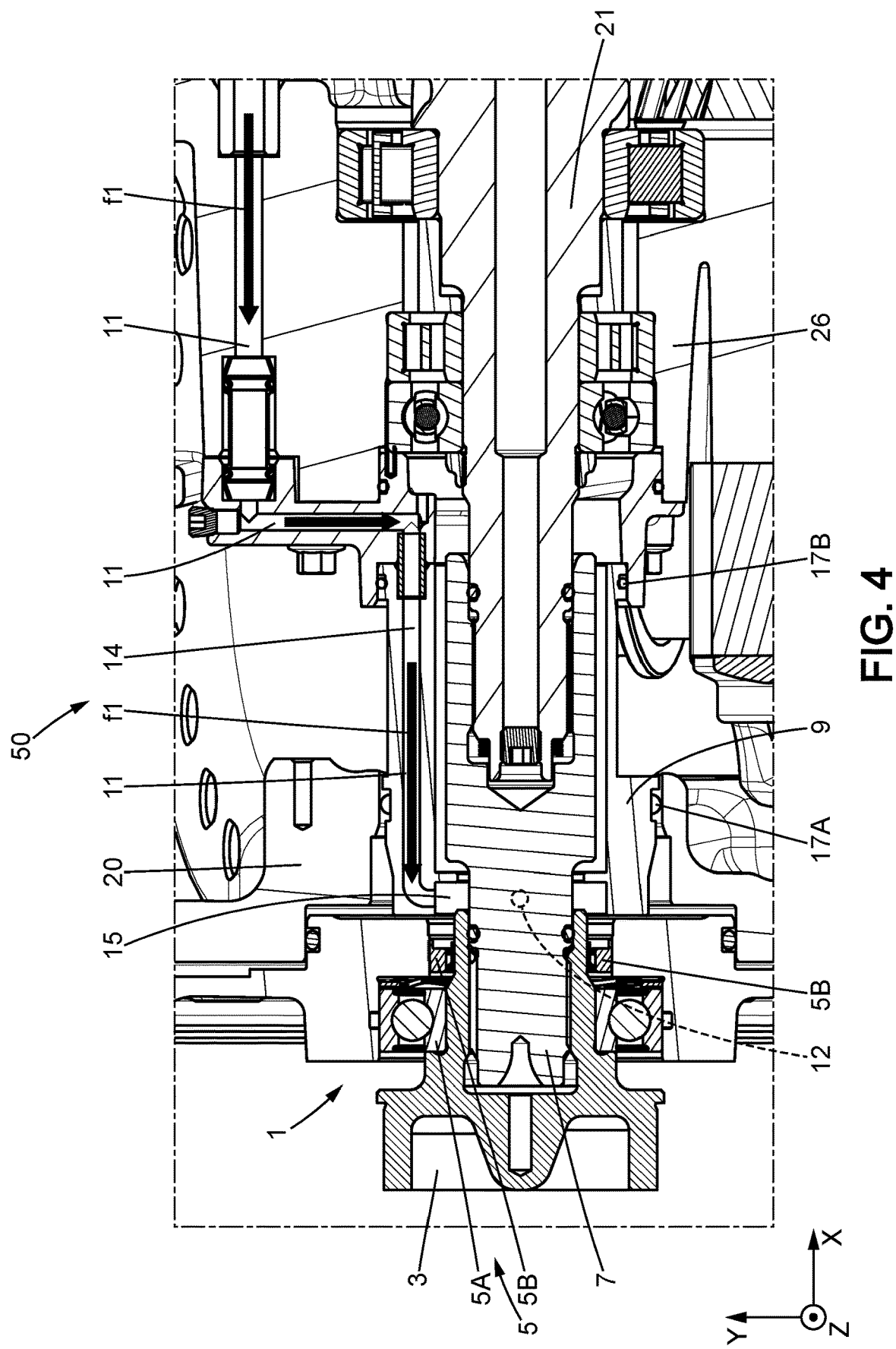
FIG. 4 is a detailed top view, in cross section, of the powertrain assembly of FIG. 2, schematically indicating a first part of a lubrication oil circulation.

In another embodiment of the powertrain assembly, represented on FIG. 2 and FIG. 4, the first oil supply channel 11 is configured to supply some of the oil flow of the oil circulation pump 25 to a seal 5B of the first sealing and bearing assembly 5. In this embodiment, the first seal 5B receives the oil flow delivered through the first oil supply channel 11. The first seal 5B is cooled by this oil flow, which extends the duration of its service life.

In this embodiment, the bearing 5A of the first sealing and bearing assembly 5 is greased for the whole lifetime of the bearing 5A. The bearing 5A itself does not need lubrication by oil but the seal 5B disposed radially between the shaft of the rotor 3 and the casing of the first electric motor 1 may require some cooling for long-term durability. This cooling is ensured by the flow of oil supplied by the first oil supply channel 11.

In this embodiment in which the seal 5B of the first sealing and bearing assembly 5 is permanently greased and thus not supplied with oil, the bearing 5A is axially comprised between the rotor 3 of the first electric motor 1 and the seal 5B of the first sealing and bearing assembly 5. The seal 5B prevents the oil lubricating the seal 5B from rejoining the bearing 5A, and from there the volume in which the rotor 3 and stator are received.

FIG. 2 is a side cross-section of the powertrain assembly 50 and illustrates the general architecture of the powertrain.

The output wheel 19 is coupled to the driving wheels 95 of the industrial vehicle 100.

The powertrain assembly 50 comprises driveshafts 40 coupling the driving wheels 95 of the vehicle 100 and the output wheel 19. The output wheel 19 is coaxial with the driveshafts 40.

The output wheel 19 is a ring gear of a differential assembly. The driveshafts 40 are coupled to the driving wheels 95 of the vehicle 100 by a sun gear and a planetary gear engaging together. The sun gear and the planetary gear are not represented on the figures.

The first input shaft 21 of the geartrain 30 comprises gears arranged in a gear housing 26. The second input shaft 22 of the geartrain 30 comprises gears arranged in the gear housing 26. A driving gear 24 of the output shaft of the geartrain 30 is arranged in the gear housing 20. The teeth of the driving gear 24 engage with the teeth of the output wheel 19. The driving gear 24 is disposed on an axial end of the output shaft. On the different figures, only the driving gear 24 is visible, and the output shaft is not visible.

The gear housing 26 is separated from the axle housing 20. The gear housing 26 and the axle housing 20 are attached to each other by several screws 27.

The gear housing 26 contains a first lubricant. The first lubricant lubricates the gears of the geartrain 30.

The axle housing 20 contains a second lubricant different from the first lubricant. The second lubricant lubricates the contact between the output wheel 19 and the driving gear 24 of the output shaft. The second lubricant is separated from the first lubricant and cannot mix with the first lubricant.

The oil circulation pump 25 is a mechanical pump driven by a rotating part of the geartrain 30. The oil circulation pump 25 is installed in the geartrain housing 26. In a non-represented variant, the oil circulation pump 25 can be an electric pump, which can be typically fitted on the side of the geartrain housing 26, so externally.

In a non-represented embodiment, the geartrain 30 may comprise a fixed gear ratio between the first input shaft 21 and the output shaft. Similarly, the geartrain 30 may comprise a fixed gear ratio between the second input shaft 22 and the output shaft.

In the illustrated embodiments, the geartrain 30 may comprise multiple selectable gear ratios between the first input shaft 21 and the output shaft. Similarly, the geartrain 30 comprises multiple selectable gear ratios between the second input shaft 22 and the output shaft. In other words, the geartrain 30 is here a gearbox. The gear housing 26 is thus a gearbox housing. The gearbox 30 comprises a gear shifting system to select the gear ratio to be used among the set of possible gear combinations. The gear ratios are selected to provide a vehicle wheel driving force adapted to the driving conditions, and to optimize the energy consumption by making the electric motors operate as often as possible in their best efficiency area.

The propulsion of the vehicle can be provided by one electric motor alone, which can be either the first electric motor 1, or the second electric motor 2. For high power requests, the two electric motors 1, 2 can simultaneously deliver mechanical power. Both input shafts 21, 22 of the geartrain or gearbox receive mechanical power and transmit it to the output wheel 19, through the output shaft and driving gear 24. The first electric motor 1 and the second electric motor 2 can be identical. They can also be different models. The first electric motor and the second electric motor can for example be permanent magnets motor, or induction motor.

The first coupling shaft 7 links an axial end of the rotor 3 of the first electric motor 1 and the first input shaft 21. A first axial end of the first coupling shaft 7 may comprise external splines engaging in internal splines of the rotor 3. In a variant, the first axial end of the first coupling shaft 7 may comprise internal splines engaging in external splines of the rotor 3. The second axial end of the first coupling shaft 7 may comprise internal splines in which external splines of the first input shaft 21 engage. In a variant, the second axial end of the first coupling shaft 7 may comprise external splines in which internal splines of the first input shaft 21 engage. The rotor 3, the first coupling shaft 7 and the first input shaft 21 are coaxial. Similarly, the second coupling shaft 8 links an axial end of the rotor 4 of the second electric motor 2 and the second input shaft 22. A first axial end of the second coupling shaft 8 may comprise external splines (or internal splines) engaging in internal splines (respectively external splines) of the rotor 4. The second axial end of the second coupling shaft 8 may comprise internal splines (or external splines) in which external splines (respectively internal splines) of the second input shaft 22 engage. In a variant not shown, the first and second coupling shafts 7,8 could be integrated respectively into the first and second input shafts 21, 22 or in the rotor shafts. This means that a direct mechanical connection/coupling is also an option.

In a non-represented embodiment, the first coupling shaft 7 may be integral with the first input shaft 21. In other words, the rotor 3 of the first electric motor 3 can be directly coupled to the first input shaft 21 of the geartrain 30. Similarly, the second coupling shaft 8 may be integral with the second input shaft 22. The rotor 4 of the second electric motor 4 can be directly coupled to the second input shaft 22 of the geartrain 30. For example, the external splines of the second input shaft 22 engage in the internal splines of the rotor 4 of the second electric motor 2. A similar coupling arrangement can be implemented for the first electric motor 1.

The first bearing 5A is a rolling bearing. The first bearing 5A may be a ball bearing, as represented on the different figures. The first bearing can also be a roller bearing, or a needle bearing.

The first bearing 5A supports the end of the rotor 3 of the first electric motor 1 which is coupled to the first coupling shaft 7. The other end of the rotor 3 is supported by another bearing 35, said rear bearing. The rear bearing 35 is here a greased bearing. No oil is delivered to this rear bearing 35.

The first electric motor 1 is attached to the axle housing 20. For example, a set of fixing screws attach a flange of the electric motor to the axle housing 20.

The implementation of the second electric motor 2 is similar to the implementation of the first electric motor 1.

The rotor 4 of the second electric motor 2 is supported by a second sealing and bearing assembly 6. The second sealing and bearing assembly 6 supports the end of the rotor 4 of the second electric motor 2 which is coupled to the second coupling shaft 8. The other end of the rotor 4 is supported by another bearing 36, said rear bearing. The rear bearing 36 is a greased bearing.

The second sealing and bearing assembly 6 comprises a bearing 6A and a seal 6B.

The seal 6B of the second sealing and bearing assembly 6 is radially comprised between the shaft of the rotor 4 of the second electric motor 2 and the housing of the second electric motor 2.

The second bearing 6 is a rolling bearing. The second bearing 6 is here a ball bearing. In non-represented embodiments, the second bearing 6 can be a roller bearing, or a needle bearing.

The second electric motor 2 is attached to the axle housing 20.

The rotor 3 of the first electric motor 1 and the rotor 4 of the second electric motor 2 are parallel.

As illustrated for example on FIGS. 2 to 5, the powertrain assembly 50 comprises:
  a first chamber 15 in fluidic communication with the first sealing and bearing assembly 5, in which the first oil supply channel 11 opens in the first chamber 15,
  a second chamber 16 in fluidic communication with the second sealing and bearing assembly 6,
  a second oil supply channel 12 configured to convey some of the oil from the first chamber 15 to the second chamber 16 so as to lubricate the second sealing and bearing assembly 6.

In the embodiment of FIG. 3 and FIG. 5, the second oil supply channel 12 is configured to supply oil to a bearing 6A of the second sealing and bearing assembly 6.

The oil flow conveyed by the second oil supply channel 12 delivers an oil flow to the bearing 6A of the second sealing and bearing assembly 6. This bearing can thus be adequately lubricated and cooled.

In the embodiment of FIG. 2 and FIG. 4, the second oil supply channel 12 is configured to supply oil to a seal 6B of the second sealing and bearing assembly 6.

In this embodiment, the bearing 6A of the second sealing and bearing assembly 6 is greased for its whole lifetime duration, and the bearing itself does not need any lubrication by oil. Nevertheless, the corresponding seal 6B disposed radially between the rotor 4 of the second electric motor 2 and the casing of the second electric motor 2 may need to be cooled to extend its useful life. This cooling is ensured by the oil flow supplied by the second oil supply channel 12.

The first bearing 5A is disposed in a first receiving housing 5H. The first receiving housing 5H is in fluidic communication with the first chamber 15.

The second bearing 6A is disposed in a second receiving housing 6H. The second receiving housing 6H is in fluidic communication with the second chamber 16.

The first chamber 15 is disposed at a higher height than the second chamber 16, along a vertical axis Z, when the powertrain assembly 50 is in a nominal installation position in the vehicle.

The second oil supply channel 12 is thus configured to allow the oil to flow from the first chamber 15 to the second chamber 16 under the effect of gravity.

The nominal installation position in the vehicle is the position when the powertrain assembly is fully fitted into the vehicle, with the vehicle disposed on a horizontal and level floor. The nominal installation position is illustrated on the different figures.

In the illustrated examples of the powertrain assembly 50, the first electric motor 1 and the second electric motor 2 are arranged one above the other along a vertical axis. The second oil supply channel 12 is vertical. On FIG. 4, the sign f1 represents the oil flow in the first oil supply channel 11. The oil is conveyed to the first chamber 15 through the first oil supply channel 11. On FIG. 5, the sign f2 represents the oil flow in the second oil channel 12. The oil flows from the first chamber 15 to the second chamber 16, through the second oil channel 12.

The first chamber 15 is configured to form an oil storage volume. The second chamber 16 is configured to form an oil storage volume.

In the illustrated embodiments of the powertrain assembly 50, and as represented on FIG. 2, the second oil supply channel 12 is formed by an internal cavity of the axle housing 20.

The second oil supply channel 12 is machined in the axle housing 20. Consequently, the second oil supply channel 12 requires no additional part.

The second oil supply channel 12 is here linear. The second oil supply channel is drilled in the axle housing 20. The second oil supply channel 12 can thus be obtained by a simple machining of the axle housing 20.

The powertrain assembly 50 comprises a third channel 13 configured to convey an oil flow from the second chamber 16 to the geartrain 30. The third channel 13 allows the oil to return to the geartrain housing 26. The oil supply to the first sealing and bearing assembly 5 and to the second sealing and bearing assembly 6 makes a circulation loop: starting from the oil tank area of the gearbox housing 26, the oil is pumped by the oil circulation pump 25, and circulates in sequence in the first oil supply channel 11, in the first sealing and bearing assembly 5, in the second oil supply channel 12, in the sealing and bearing assembly 6, in the third oil channel 13, and returns to the oil tank area of the gearbox housing 30.

As detailed on FIG. 4, the powertrain assembly 50 comprises a first tubular member 9 surrounding the first coupling shaft 7, and a portion of the first oil supply channel 11 is formed by an internal cavity 14 of the first tubular member 9.

The first tubular member 9 is fixed relatively to the axle housing 20.

The first tubular member 9 surrounds the first input shaft 21 along a portion of the length of the first input shaft 21.

Compared to configurations from prior art in which the lubrication of the bearing 5A of the first electric motor 1 and of the bearing 6A of the second electric motor 2 is done by projections from the output wheel 19, only static sealing between the first tubular member 9 and the gear housing 26 is required. Indeed, no dynamic sealing of the first input shaft 21 with respect to the housing 26 of the gearbox 30 is required since the same oil is present in the gearbox 30 and in the first tubular member 9.

The first tubular member 9 is parallel with the first bearing 5. The first tubular member 9 has the general shape of a cylinder. The first tubular member 9 is opened at both its axial ends so that the first coupling shaft 7 and the first input shaft 21 can pass through the first tubular member 9. The first tubular member 9 is disposed in the axle housing 20.

As particularly represented on FIG. 4, the first tubular member 9 comprises the first chamber 15, and a portion of the first oil supply channel 11 opens into the first chamber 15. The first chamber 15 is coaxial with the first bearing 5.

The internal cavity 14 forming a portion of the first oil supply channel 11 extends parallelly to the extension axis of the first tubular member 9. The internal cavity 14 forming a portion of the first oil supply channel 11 opens in an upper part of the first chamber 15.

The first tubular member 9 is axially blocked in sandwich between the first motor 1 and the geartrain housing 26, with a small axial clearance. The first tubular member 9 axially abuts on one side, with a small axial gap on the other side, so that the assembly is isostatic.

The powertrain assembly 50 comprises a third seal 17A between the first tubular member 9 and the axle housing 20. The third seal 17A is disposed in a groove formed on the external lateral side of the first tubular member 9. The third seal 17A is compressed in the radial gap between the first tubular member 9 and the axle housing 20.

As detailed on FIG. 5, the powertrain assembly 50 comprises a second tubular member 10 surrounding the second coupling shaft 8, and the third oil channel 13 is formed by an internal wall of the second tubular member 10.

The second tubular member 10 is fixed relatively to the axle housing 20. The second tubular member 10 surrounds the second input shaft 22 along a portion of the length of the second input shaft 22.

As before, no dynamic sealing of the second input shaft 22 of the gearbox 30 is required since the same oil is present in the gearbox 30 and in the second tubular member 10.

The second tubular member 10 is parallel with the second bearing 6. The second tubular member 10 is cylindrical. The second tubular member 10 is disposed in the axle housing 20.

The third oil supply channel 13 is formed by the space radially extending between the inner wall of the second tubular member 10 and the outside surface of the second coupling shaft 8. On FIG. 5, the sign f3 illustrates schematically the oil flowing in the second tubular member 10 and returning to the oil storage area of the gearbox housing 26.

The second tubular member 10 comprises the second chamber 16, and the third oil channel 13 opens into the second chamber 16.

The second oil supply channel 12 opens in both the first chamber 15 and the second chamber 16.

The second tubular member 10 is axially blocked in sandwich between the second motor 2 and the geartrain housing 26, with a small axial clearance. The second tubular member 10 is sandwiched between the second motor 2 and the geartrain housing 26 in an axial direction. The second tubular member 10 axially abuts on one side, with a small axial gap on the other side, so that the assembly is isostatic.

The powertrain assembly 50 also comprises a fourth seal 18A between the second tubular member 10 and the axle housing 20. The fourth seal 18A is disposed in a groove formed on an external lateral side of the second tubular member 10. The fourth seal 18A is radially compressed.

The powertrain assembly 50 comprises a fifth seal 17B between the first tubular member 9 and the gear housing 26. The fifth seal 17B is radially compressed between an outside surface of the first tubular member 9 and an internal wall of a first reception chamber of the gear housing 26.

The powertrain assembly 50 comprises a sixth seal 18B between the second tubular member 10 and a gear housing 26. The sixth seal 18B is disposed in a groove formed on an external lateral side of the second tubular member 10. The sixth seal 18A is radially compressed between an outside surface of the second tubular member 10 and an internal wall of a second reception chamber 29 of the gear housing 26.

What is claimed is:

1. A powertrain assembly for an industrial vehicle, comprising:
an axle housing receiving an output wheel,
a geartrain comprising:
a first input shaft,
a second input shaft,
an output shaft engaged with the output wheel, and
an oil circulation pump configured to supply oil to gears of the geartrain,
a first electric motor, comprising a rotor coupled to the first input shaft of the geartrain, the rotor being supported by a first sealing and bearing assembly,
a second electric motor, comprising a rotor coupled to the second input shaft of the geartrain,
a first tubular member, fixed relatively to the axle housing, a first axial end of the first tubular member abuts against the first electric motor and a second axial end of the first tubular member abuts against a gear housing or against a part fixedly mounted in the gear housing, and
a first oil supply channel configured to supply some of the oil flow of the oil circulation pump to the first sealing and bearing assembly, wherein a portion of the first oil supply channel is formed by an internal cavity of the first tubular member.

2. A powertrain assembly according to claim 1, in which the first oil supply channel is configured to supply some of the oil flow of the oil circulation pump to a bearing of the first sealing and bearing assembly.

3. A powertrain assembly according to claim 1, in which the first oil supply channel is configured to supply some of the oil flow of the oil circulation pump to a seal of the first sealing and bearing assembly.

4. A powertrain assembly according to claim 1, in which the rotor of the second electric motor is supported by a second sealing and bearing assembly, the powertrain assembly comprising:
a first chamber in fluidic communication with the first sealing and bearing assembly, in which the first oil supply channel opens into the first chamber,
a second chamber in fluidic communication with the second sealing and bearing assembly,
a second oil supply channel configured to convey some of the oil from the first chamber to the second chamber so as to lubricate the second sealing and bearing assembly.

5. A powertrain assembly according to claim 4, in which the second oil supply channel is configured to supply oil to a bearing of the second sealing and bearing assembly.

6. A powertrain assembly according to claim 4, in which the first chamber is disposed at a higher height than the second chamber, along a vertical axis, when the powertrain assembly is in a nominal installation position in the vehicle.

7. A powertrain assembly according to claim 4, in which the second oil supply channel is formed by an internal cavity of the axle housing.

8. A powertrain assembly according to claim 4, comprising a third oil channel configured to convey an oil flow from the second chamber to the geartrain.

9. A powertrain assembly according to claim 4, in which the first tubular member comprises the first chamber, and a portion of the first oil supply channel opens into the first chamber.

10. A powertrain assembly according to claim 4, in which the powertrain assembly comprises a third seal between the first tubular member and the axle housing.

11. A powertrain assembly according to claim 8, comprising a second tubular member, in which the third oil channel is formed by an internal wall of the second tubular member,
and in which the second tubular member is fixed relatively to the axle housing.

12. A powertrain assembly according to claim 11, in which the second tubular member comprises the second chamber, and the third oil channel opens into the second chamber.

13. A powertrain assembly according to claim 10, in which a first axial end of the second tubular member abuts against the second electric motor and a second axial end of the second tubular member abuts against a gear housing,
and in which the powertrain assembly comprises a fourth seal between the second tubular member and the axle housing.

14. A powertrain assembly according to claim 1, in which the rotor of the first electric motor is coupled to the first input shaft of the geartrain by a first coupling shaft, in which the rotor of the second electric motor is coupled to the second input shaft of the geartrain by a second coupling shaft,
in which at least a part of the first coupling shaft and at least a part of the second coupling shaft extend in the axle housing.

15. A truck comprising a powertrain assembly according to claim 1, in which the output wheel is coupled to wheels of the truck.

16. A powertrain assembly for an industrial vehicle, comprising:
an axle housing receiving an output wheel,
a geartrain comprising:
a first input shaft,
a second input shaft,
an output shaft engaged with the output wheel, and
an oil circulation pump configured to supply oil to gears of the geartrain,
a first electric motor, comprising a rotor coupled to the first input shaft of the geartrain, the rotor being supported by a first sealing and bearing assembly,
a second electric motor, comprising a rotor coupled to the second input shaft of the geartrain,
a first oil supply channel configured to supply some of the oil flow of the oil circulation pump to the first sealing and bearing assembly,
in which the rotor of the second electric motor is supported by a second sealing and bearing assembly, the powertrain assembly comprising:
a first chamber in fluidic communication with the first sealing and bearing assembly, in which the first oil supply channel opens into the first chamber,
a second chamber in fluidic communication with the second sealing and bearing assembly, and
a second oil supply channel configured to convey some of the oil from the first chamber to the second chamber so as to lubricate the second sealing and bearing assembly,
in which the first chamber is disposed at a higher height than the second chamber, along a vertical axis, when the powertrain assembly is in a nominal installation position in the vehicle.

* * * * *